(12) United States Patent
Droesbeke

(10) Patent No.: US 9,733,437 B2
(45) Date of Patent: Aug. 15, 2017

(54) CONNECTOR COMPRISING A LOCKING DEVICE

(75) Inventor: Gert Droesbeke, Saint-Vit (FR)

(73) Assignee: FCI Asia Pte. Ltd., KA Place (SG)

( * ) Notice: Subject to any disclaimer, the term of this patent is extended or adjusted under 35 U.S.C. 154(b) by 0 days.

(21) Appl. No.: 14/407,304

(22) PCT Filed: Jun. 12, 2012

(86) PCT No.: PCT/IB2012/001592
§ 371 (c)(1),
(2), (4) Date: Dec. 11, 2014

(87) PCT Pub. No.: WO2013/186585
PCT Pub. Date: Dec. 19, 2013

(65) Prior Publication Data
US 2015/0125119 A1    May 7, 2015

(51) Int. Cl.
*G02B 6/38* (2006.01)
*G02B 6/42* (2006.01)
*H01R 13/627* (2006.01)
*H01R 13/6582* (2011.01)
*H01R 13/6593* (2011.01)

(52) U.S. Cl.
CPC ......... *G02B 6/3893* (2013.01); *G02B 6/3821* (2013.01); *G02B 6/3885* (2013.01); *G02B 6/4277* (2013.01); *H01R 13/627* (2013.01); *H01R 13/6582* (2013.01); *H01R 13/6593* (2013.01)

(58) Field of Classification Search
CPC .. G02B 6/3806; G02B 6/3893; G02B 6/3821; G02B 6/3885; G02B 6/4277; G02B 6/387; G02B 6/3897; H01R 13/627; H01R 13/6582; H01R 13/6593
See application file for complete search history.

(56) References Cited

U.S. PATENT DOCUMENTS 5,154,629 A * 10/1992 Carver ................ G02B 6/3817
439/352
6,450,697 B1 * 9/2002 Ngo ..................... G02B 6/3817
385/72

FOREIGN PATENT DOCUMENTS

| CN | 101197475 A | 6/2008 |
|---|---|---|
| EP | 0 497 463 A2 | 8/1992 |
| EP | 1 182 478 A1 | 2/2002 |
| EP | 1 624 534 A2 | 2/2006 |
| EP | 1 930 985 A2 | 6/2008 |

* cited by examiner

*Primary Examiner* — John M Bedtelyon
(74) *Attorney, Agent, or Firm* — Wolf, Greenfield & Sacks, P.C.

(57) ABSTRACT

A connector including a housing with a cable entry and a contact face presenting one or more conductors for signal transfer to associated conductors of a complementary connector. The connector includes a cable entry shield of an electro-conductive material gripping around the cable at the cable entry. The cable entry shield can for example be formed by a pin holder for holding alignment pins and the base of a locking device, jointly gripping around the cable.

20 Claims, 9 Drawing Sheets

CONNECTOR COMPRISING A LOCKING DEVICE

FIELD OF THE DISCLOSURE

The invention relates to a connector comprising a releasable locking device.

BACKGROUND OF THE DISCLOSURE

Optical cable connectors are configured to engage a complementary receptacle connector, such as a complementary optical cable connector, or a board connector. For a smooth and reliable transfer of light signals from the fiber ends to light conductors of the complementary connector the connector should position and fixate the terminal fiber ends accurately when the connecter is connected to a complementary connector. Latch mechanisms can be used to secure contact between two complementary connectors. Generally, such latch mechanisms are designed as releasable systems.

The signal transfer between the contacts of the connectors can be negatively affected by electromagnetic interference. This is also the case for optical connectors. Therefore, it is an object of the invention to provide a connector with improved shielding against electromagnetic interference.

SUMMARY OF THE DISCLOSURE

A connector is disclosed comprising a housing with a cable entry and a contact face presenting one or more conductors for signal transfer to associated conductors of a complementary connector, wherein the connector comprises a cable entry shield of an electro-conductive material gripping around the cable at the cable entry. It has been found that the cable entry of a cable connector can be a potential leak for electro-magnetic interference and that shielding this cable entry side substantially improves signal transfer quality.

In a specific embodiment, the cable entry shield is formed by two or more connected parts gripping around the cable at the cable entry. Alternatively, the cable entry shield can be a single part, if so desired.

One of the cable entry shield parts can for example be a base of a locking device, which can for instance comprise one or more latches. Suitably, the locking device may comprise two latches, at opposite sides of the connector.

The latches can for example be pivotable between a locking position and a release position. The pivot axis can for instance be formed by a peg on the outer surface of the housing.

In a specific embodiment, the locking device may comprise a resilient section between the base and the latch biasing the latch to the locking position. The resilient section can for example comprise a U-turn section and an actuation section connecting the U-turn section to the one or more latches for pivoting the latches to the release position against the action of the resilient section.

The housing of the connector can for instance comprise an open side covered by the actuation section of the locking device. The actuation section may comprise one or more stops abutting respective edges of the housing bordering the open side of the housing.

Optionally, the latches, the actuation section, the resilient section and the base of the locking device can be formed a single part, such as a stamped and bent sheet metal. This allows a compact design of the locking device with integrated shielding function, which reduces the number of parts.

Optionally, the second shielding part is a pin holder, holding the ends of alignment pins extending through a ferrule.

The connector can be an optical cable connector configured to connect to a complementary optical board connector or optical cable connector. Alternatively, the connector can for example be an electrical cable connector or board connector.

BRIEF DESCRIPTION OF THE DRAWINGS

The invention will be further explained under reference to the accompanying drawings.

DETAILED DESCRIPTION OF EMBODIMENTS

Figure 1:
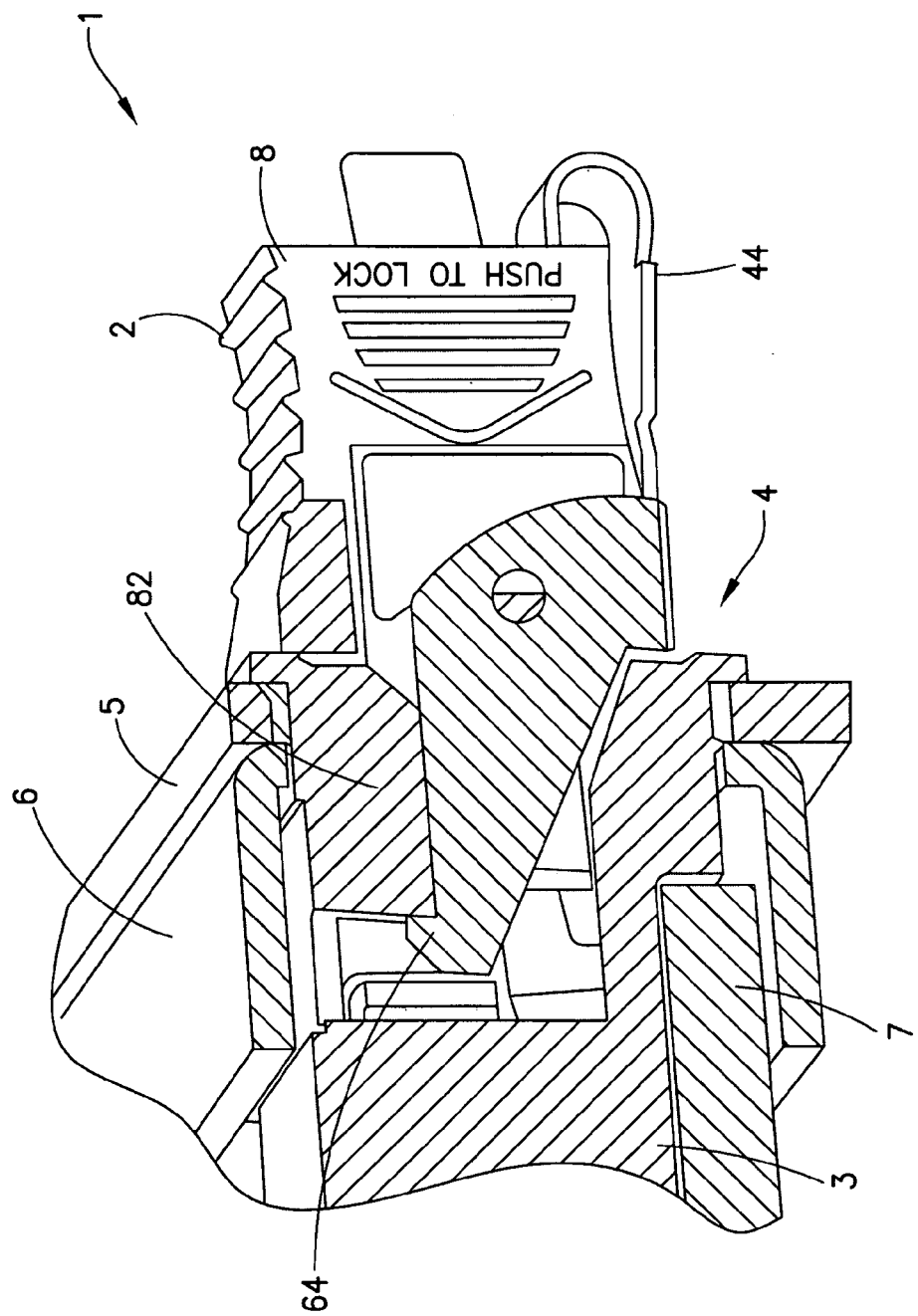
FIG. 1: shows an exemplary embodiment of an assembly of a connector with a complementary front panel connector slot.

FIG. 1 shows an assembly 1 of an optical cable connector 2 with a front panel adaptor 3 accessible via a slot 4 in a front panel made of electro-conductive brackets 6 covered with a non-conductive cover plate 5. In the drawing one side of the adapter 3 is broken away to show the internals of the adapter 3. The front panel can typically be provided with a column of brackets 6 each bracket providing a row of slots 4. The adaptor 3 floats above a sliding card 7. Alternatively, the adapter can be mounted on the sliding card 7, e.g., in case of an electrical connector with leads which have to be terminated with electrical traces of the sliding card.

Figure 3:
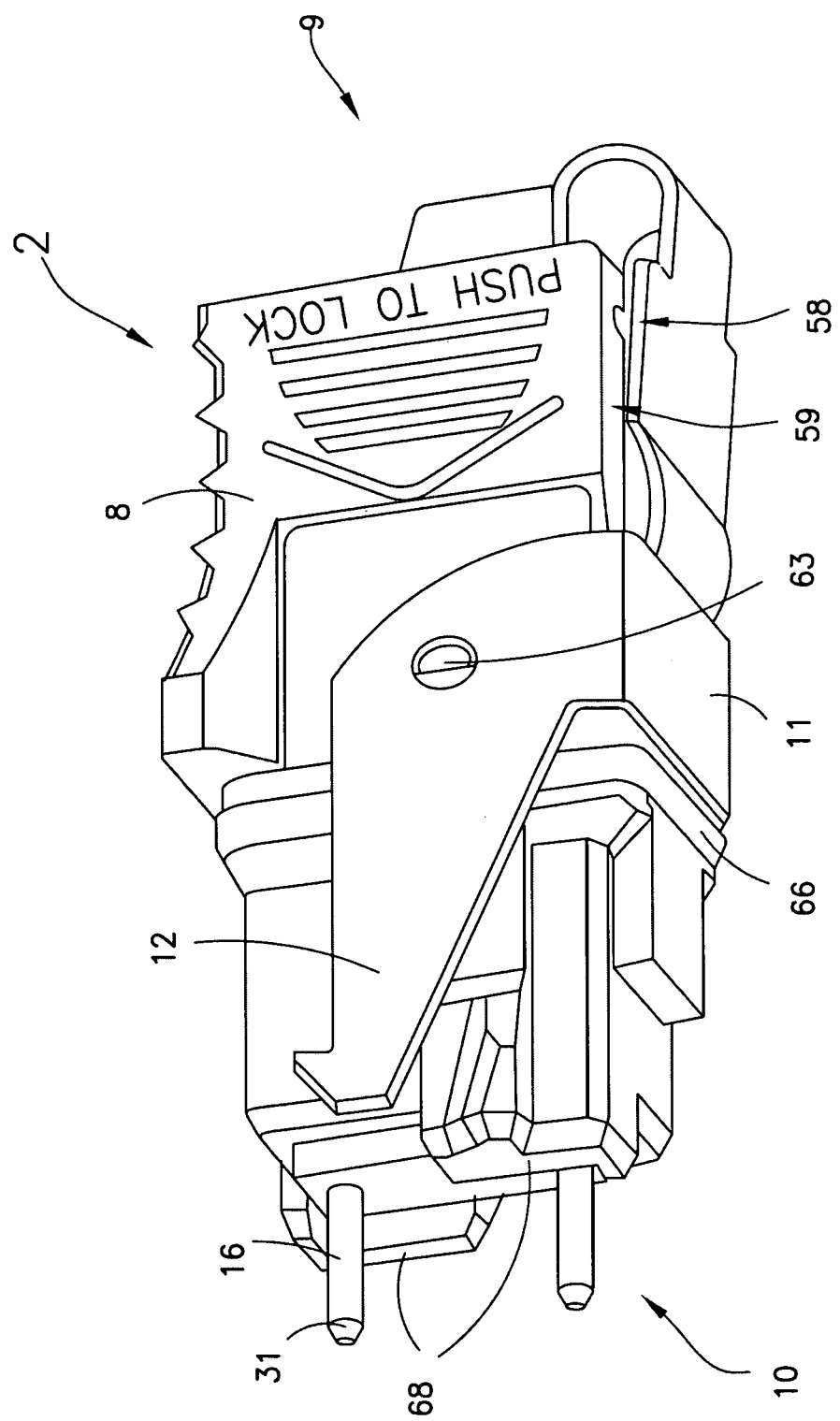
FIG. 3: shows in perspective view the connector of the assembly of FIG. 1.

The cable connector 2 is shown in more detail in FIG. 3. The connector 2 comprises an electro-conductive housing 8 with a cable entry side 9 and an opposite contact side 10. A latch clip 11 provides a latch 12 at both vertical sides of the connector 2.

Figure 4:
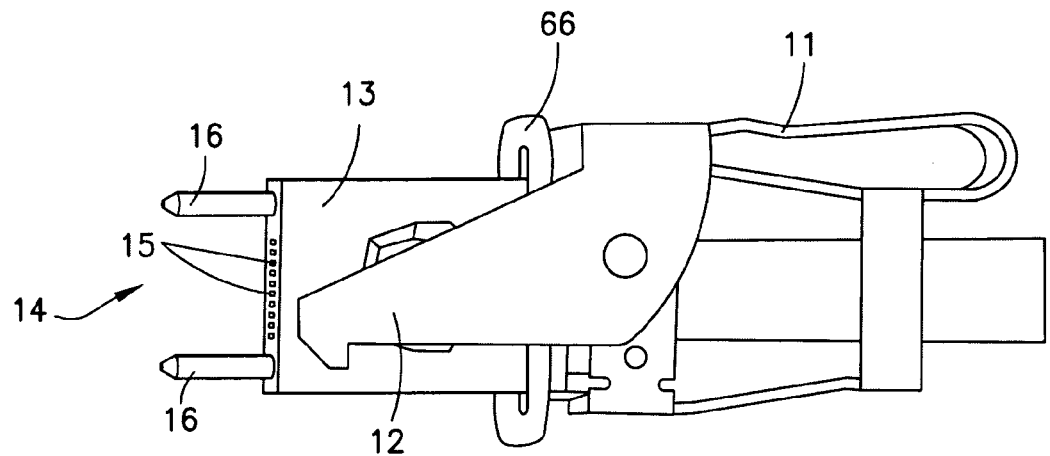
FIG. 4: shows in perspective view the internals of the connector of FIG. 3.
Figure 13:
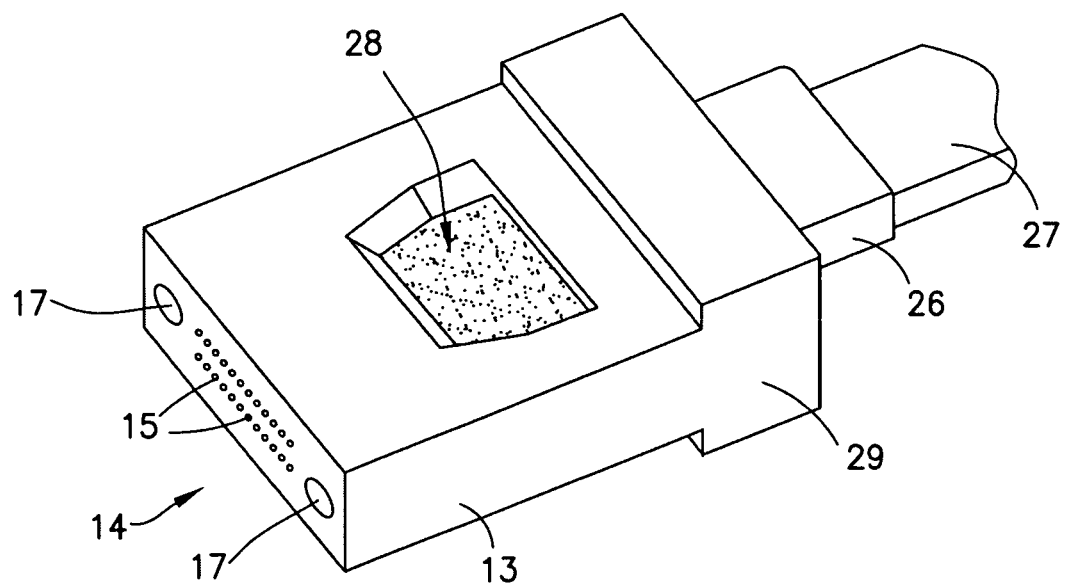
FIG. 13: shows the ferrule of FIG. 5 from a different view point.

FIG. 4 shows the connector 2 without the housing 8 to show the connector internals. The cable connector 2 comprises a ferrule 13 with a contact face 14 presenting an array of optical fiber ends 15 (see also FIG. 13). The array of fibers ends 15 is flanked by two symmetrically arranged alignment pins 16. In an alternative embodiment, the ferrule 13 may have receiving openings for receiving alignment pins of the adapter 3, or of any other used type of complementary connector.

Figure 6:
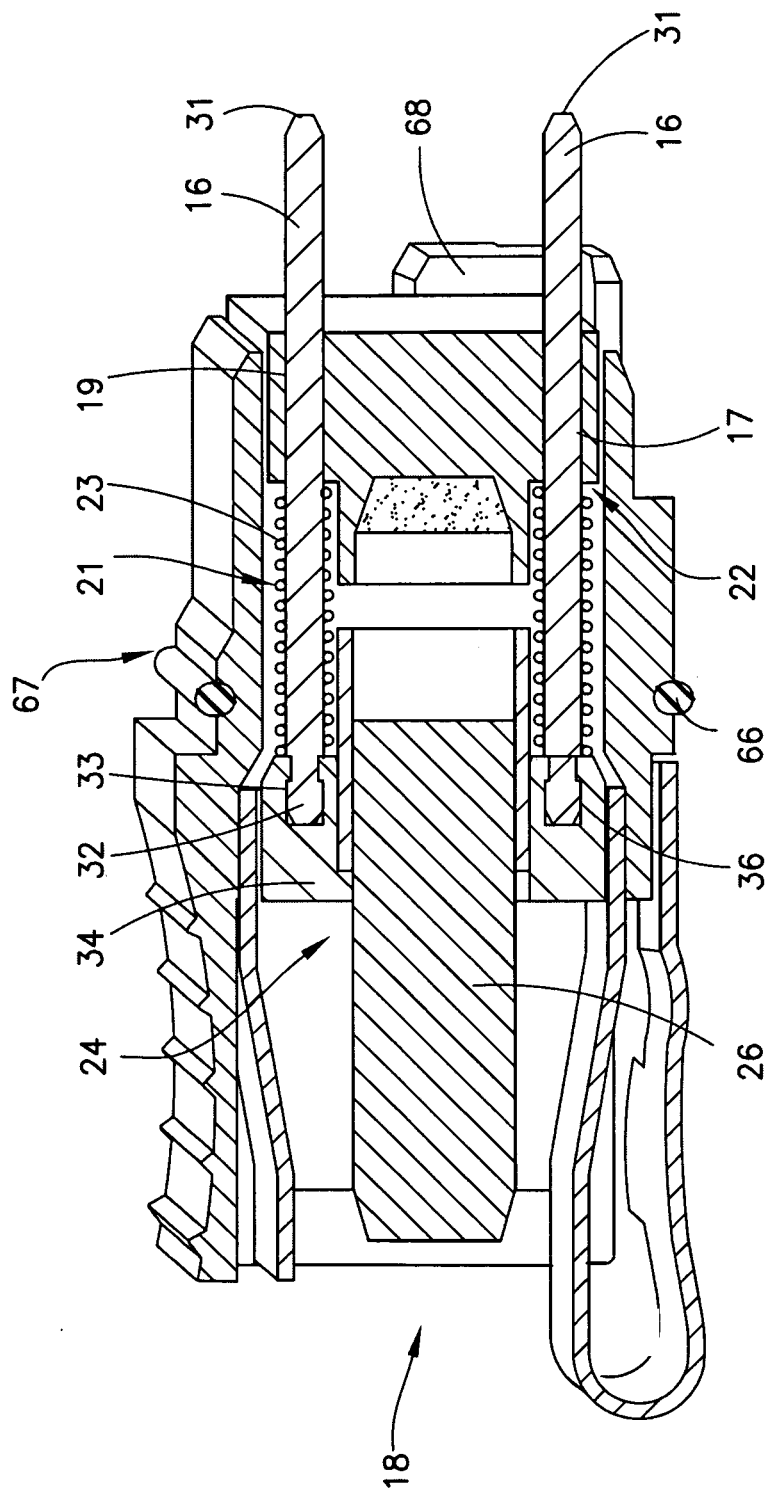
FIG. 6: shows the ferrule of FIG. 5 in cross-section.

As seen in the cross section of FIG. 6, the alignment pins 16 are positioned in parallel straight channels 17 extending over the full length of the ferrule 13 from the contact face 14 to a cable entry end 18. The channels 17 have a front section 19 with a smaller diameter, and a back section 21 with a larger diameter. The back sections 21 run between the front section 19 and the cable entry side 18. A shoulder 22 is formed by the diameter transition between the front and back sections 19, 21. Compression springs 23 are partly sunk within the back sections 21, abutting the respective shoulders 22. When uncompressed the compressions springs 23 are longer than the back channel sections 21.

Figure 5:
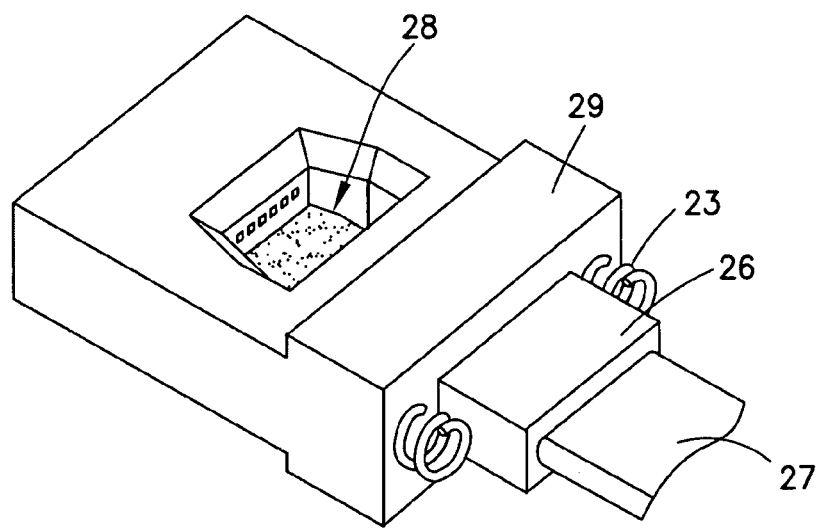
FIG. 5: shows in perspective view the ferrule of the connector of FIG. 3.

At the cable entry side 18 the ferrule 13 comprises an opening 24 receiving a rectangular cable boot 26. At one end the cable boot 26 holds the terminal end of the cable 27. Stripped terminal fiber ends 15 from fibers held by the cable 27 extend from the other end of the cable boot 26, received in the ferrule 13 via a central opening 28, which is filled with a cured binder, such as an epoxy binder, fixating the fibers. The ferrule 13 comprises a widened section 29 around the cable entry opening 24 (see FIG. 5). The widened section 29 can be locked in the housing in a slideable manner. Alternatively, the ferrule 13 can be provided with a different profile for guiding the sliding movement relative to the housing, such as one or more protrusions and/or slots.

Figure 7:
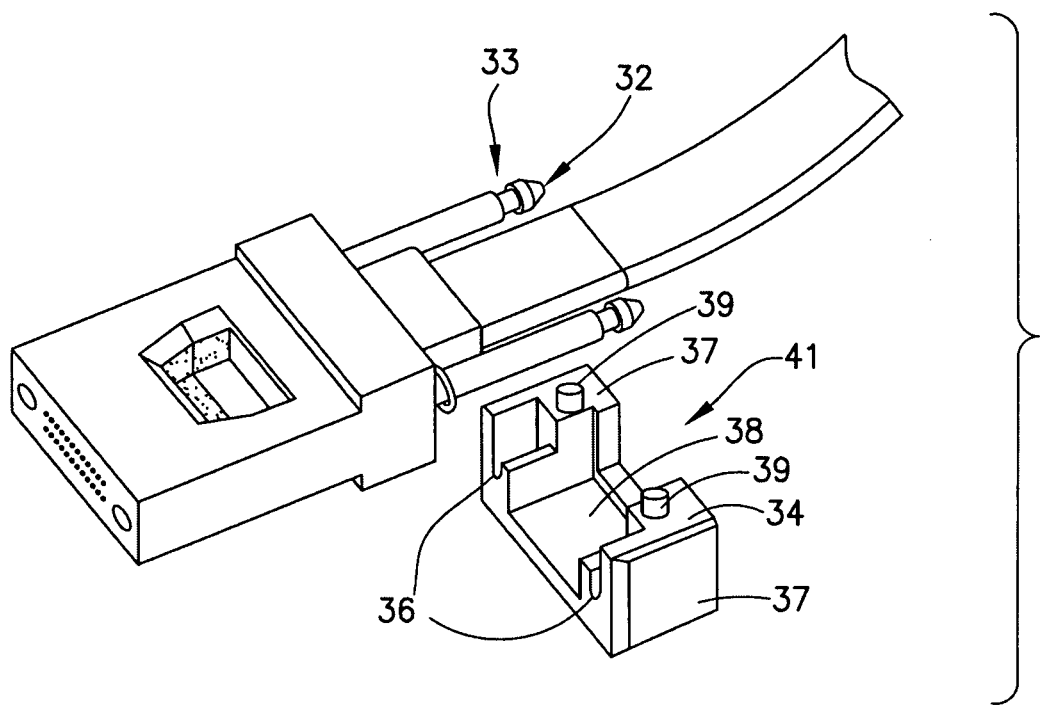
FIG. 7: shows the ferrule of FIG. 5 with pin holder.

The alignment pins 16 have beveled ends 31, 32. At the cable entry side the beveled ends 32 show a constricted section 33. The beveled ends 32 are capped with a pin holder 34 having recesses 36 which are dimensioned to grip around the constricted sections 33 of the alignment pins 16 (see FIG. 7). The pin holder 34 forms a pressure surface for the compression springs 23. The pin holder 34 is made of an electro-conductive material to contribute to an effective shielding against electromagnetic interference. The recesses 36 are present in side blocks 37 bridged at one side by a side face 38. At the opposite side the side blocks 37 comprise pegs 39. The side blocks 37 confine a cable passage 41, which is narrowed to a narrow fit with the cable 27.

Figure 9:
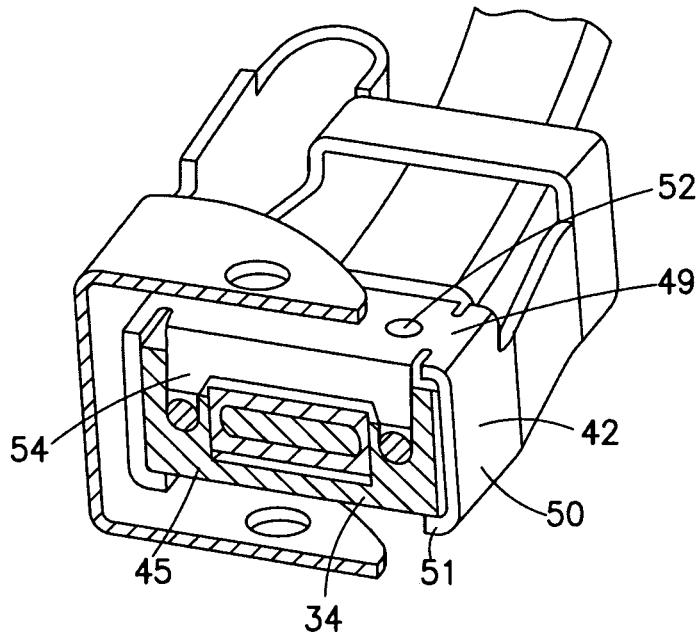
FIG. 9: shows the latch clip and pin holder of FIG. 8 in cross-section.
Figure 8:
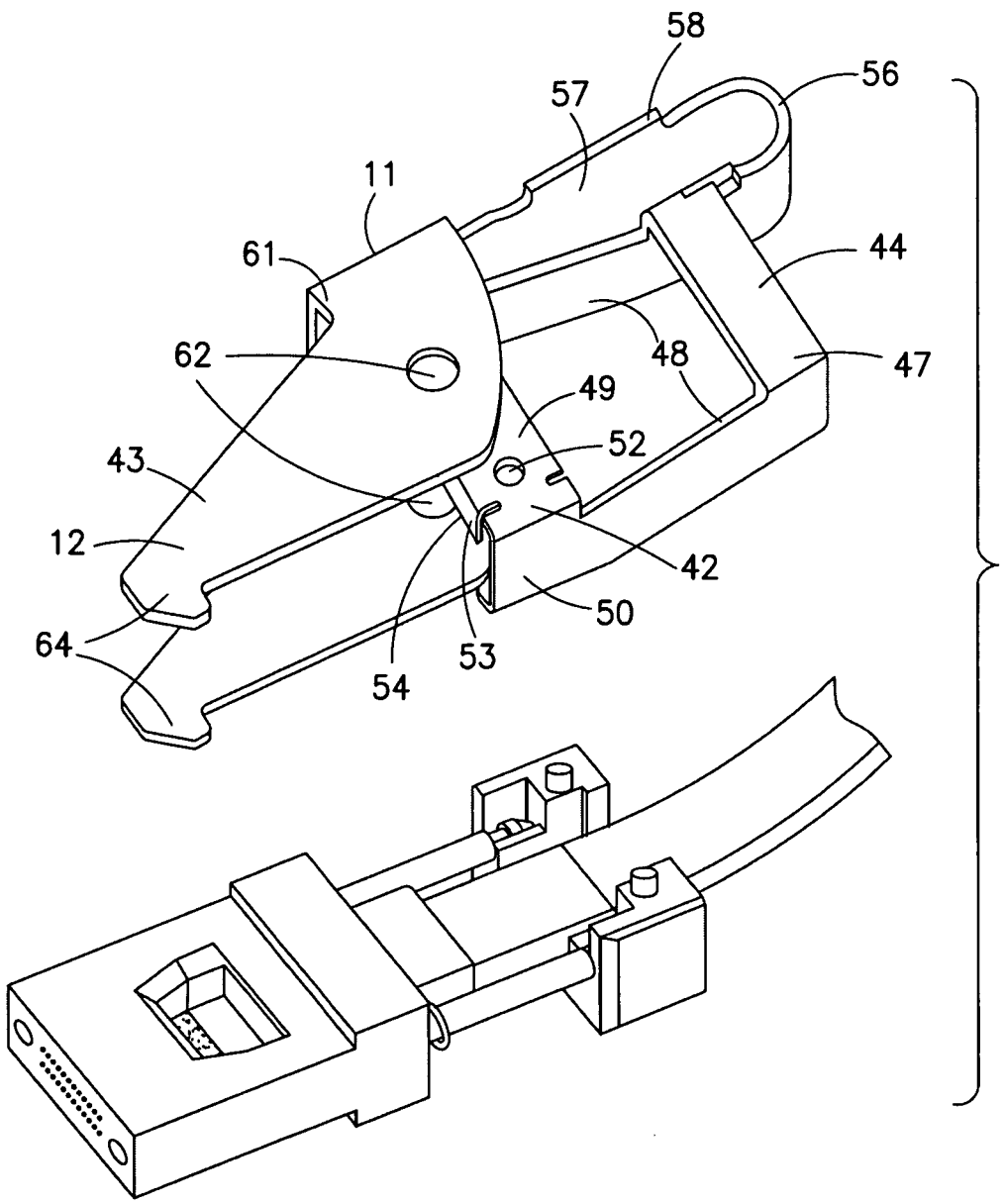
FIG. 8: shows the ferrule of FIG. 5 with pin holder and latch clip.

The latch clip 11 is clipped onto the pin holder 34 (see FIGS. 8 and 9). The latch clip 11 comprises a mounting bracket or base 42, a latch section 43 with the two latches 12, and a leaf spring section 44 connecting the mount bracket 42 and the latch section 43.

Figure 11:
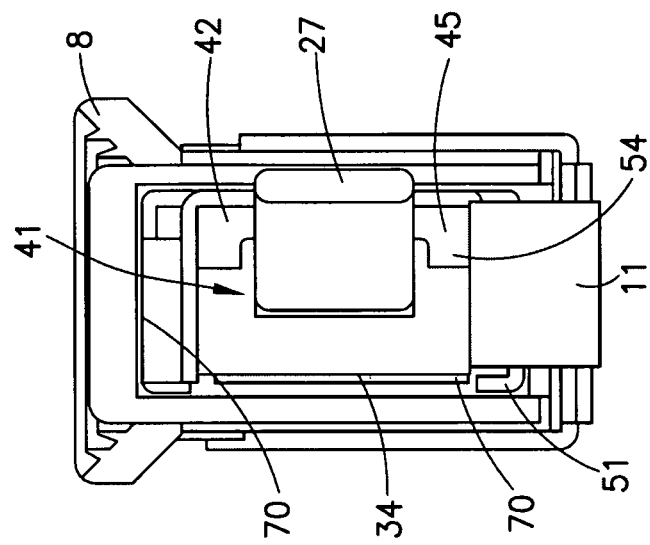
FIG. 11: shows a rear view of the connector of FIG. 3.

The mounting bracket 42 is U-shaped with an upper face 49 and two legs 50 with inwardly bent terminal ends 51, gripping around the pin holder 34 when the connector 2 is assembled. The pin holder 34 and the bracket 42 are both made of an electro-conductive material. After being assembled around the cable 27 the mounting bracket 42 of the latch clip 11 and the pin holder 34 jointly form a cable entry shield 45, shielding the connector assembly from electromagnetic interference (FIGS. 9 and 11).

The upper surface 49 comprises two openings 52 receiving the pegs 39 of the pin holder 34. The upper face 49 is provided with an inwardly bent front edge 53 with extensions 54 locking the pin ends 31 in the recesses 37 of the pin holder 34 (FIG. 9).

The spring section 44 comprises a smaller rear bracket 47 and two side flanges 48 connecting the mounting bracket 42 with the rear bracket 47. The spring section 44 of the latch clip 11 further comprises a U-turn section 56 connected at one side of the rear bracket 47. The U-turn section 56 makes a turn of more than 180 degrees. It is noted that initially this angle may be substantially smaller to facilitate assembling of the connector 2. After clicking the front bracket 46 onto the pin holder 34 and after positioning the housing 8, the U-turn 56 can be bent to shift the latch section 43 in the desired position over the housing 8.

The bent end of the U-turn 56 is connected to a flat actuation section 57 connected to the latch section 43. The length of the actuation section 57 corresponds to the combined length of the bracket 42, side flanges 48 and rear bracket 47 of the latch clip 11.

The lower side of the housing 8 is interrupted at the location of the flat section 57. The actuation section 57 has side edges with rectangular extensions 58. These rectangular extensions 58 abut the edges 59 of the interrupted part of the housing if a user pushes the actuation section to deep (see FIG. 3). This reduces the risk of overstressing parts of the latch clip 11.

The latch section 43 comprises a U-shaped base 61 in line with the flat section 57. Near the end of the legs of the U-shaped base 61 openings 62 are configured to receive a cylindrical pivot axis 63 on the surface of the housing 8 of the connector 2 to form a pivot (see FIG. 3).

The latches 12 extend from the legs of the U-shaped base 61 towards the contact side 10. The latches 12 are provided with a cam 64 configured to cooperate with a complementary locking section of the front panel adapter 3, as will be explained hereinafter.

An electromagnetic gasket 66 extends around the housing 8 and is configured to seal against the inner surface of the adapter 3. The gasket 66 is partly sunk in a recess 67 of the housing 8 (FIG. 6).

At the contact end 10 the housing 8 comprises two protective L-shaped ridges 68 at two diagonally opposite corners of the ferrule 13 (see FIG. 3), protecting the fiber ends at the contact face of the ferrule 13.

Figure 10:
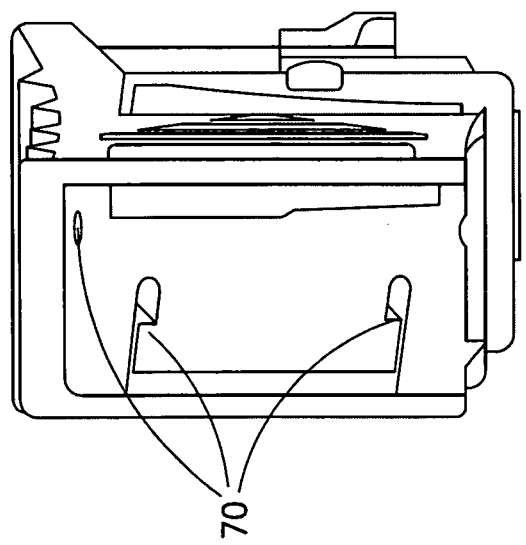
FIG. 10: shows the housing of the connector of FIG. 3.

The inner side of the housing 8 is provided with a number of ribs 70 (see FIGS. 10 and 11). When the connector 2 is assembled at least two of these ribs 70 abut the pin holder 34. The other ribs 70 abut respective side faces of the mounting section 42 of the latch clip 11. The ribs 70 are sufficiently small to slightly deform, when the latch clip 11 and the pin holder 34 are inserted into the housing 8 during assembly. The housing 8, the latch clip 11 and the pin holder 34 are all of electro-conductive materials. By firmly contacting these parts by means of the ribs 70 effective electromagnetic shielding is obtained. This shielding is further improved by minimizing space between the cable 27 and the cable passage 41 confined by the latch clip 11 and the pin holder 34.

Figure 2:
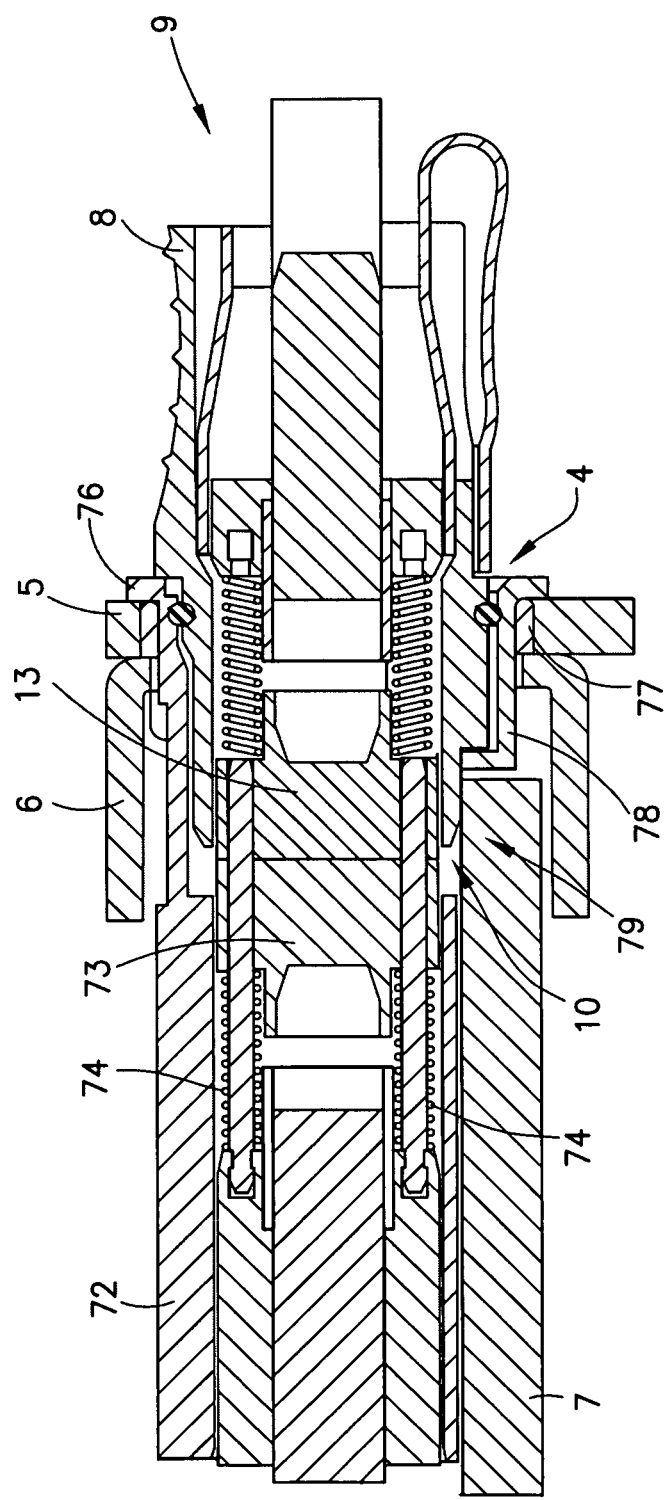
FIG. 2: shows the assembly of FIG. 1 in cross section.

As shown in FIG. 2 the adaptor 3 comprises a housing 72 holding a ferrule 73 of the same construction as the ferrule 13 of the connector 2. When the connector 2 is inserted into the adapter 3, the channels 74 of the ferrule 73 of the adapter are in line with the channels 17 of the ferrule 13 of the connector 2. The alignment pins 16 of the connector 2 extend into the channels 74 of the ferrule 73 of the adaptor 3. This way, the array of terminal fiber ends 15 of the ferrule 13 of the connector 2 is accurately aligned with the corresponding array of fiber ends of the adapter ferrule 73, reducing the risk of failing signal transfer. In an alternative embodiment, the alignment pins 16 may extend through compression springs of a mated connector. This requires even less space and enables an even more compact construction of the connector.

The adapter 3 comprises a mating end with a collar 76 at the front side of the cover plate 5, hooking behind the edge of the slot 4. Between the inner edge of the slot 4 and the adapter 3 an electromagnetic gasket 77 is provided to reduce the risk of electromagnetic interference with the signal transfer.

The adapter 3 has a bottom wall 78 extending between the collar 76 and the front edge of the sliding card 7. The adapter 3 lays on or floats above the sliding card 7 without having a bottom wall in the region 79 of the mated cable connector 2.

Figure 12:
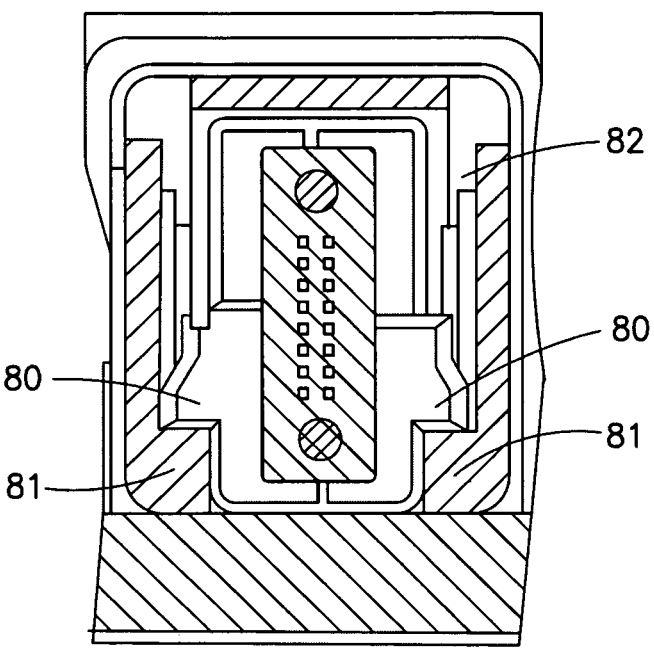
FIG. 12: shows a cross section of the assembly of FIG. 1.

At the lower end of its inner side walls the adapter 3 is provided with ridges 81 supporting correspondingly configured wings 80 at the contact side of the connector 2, as shown in FIG. 12.

At a distance above the ridges 81 the inner wall of the adaptor 3 is provided with a locking rib 82. In FIG. 1, the wall of the adapter 1 is broken away to show the adapter internals. As a consequence, the locking rib 82 is shown as a separate web. In real the rib 82 is a thickened section of the adapter wall. The rib 82 and the latch 12 are dimensioned in such way that the cam 64 hooks behind the rib 82 when the connecter 2 is properly positioned in the adapter 3. In this position, the latches 12 pull the ferrule 13 towards the contact side 10 against the action of the compression springs 23.

The connector 2 can be disconnected from the adapter 3 and the slot 4 by pushing the leaf spring section 44 of the latch clip 11 inwardly towards the cable 27. This can for instance be done by squeezing the upper side of the housing 8 and the latch clip 11 together. The latches 12 will pivot about the pivot axes 63 until the cams 64 unhook from the ribs 82 at the inner side of the adapter 3. As a result the compression springs 23 will relax and will push the ferrule 13 and the rest of the connector 2 apart. As the pin holder 34 is a fixed part of the housing 8, the latches 12 will be pushed away from the locking ribs 82. Consequently, the latches cannot re-hook and remain unhooked when pressure is released from the leaf spring section 44.

In the shown embodiment, the adapter 3 floats above the sliding card 7. The sliding card 7 does not need to be adapted to enable positioning of the adapter 3 in the slot 4. In an alternative embodiment, the adapter may be mounted to the sliding card. This may for instance be required if the connector is an optical cable connector comprising a transformer for transforming optical signals to electrical signals, and a contact face presenting electrical contacts for signal transfer to associated electrical contacts of the adapter. To reduce loss of signal strength with electrical signal conductors the signal paths need to be as short as possible, which makes it desirable to lead the conductors directly to the sliding card, requiring mounting of the adapter to the sliding card.

The invention claimed is:

1. A connector comprising a housing with a cable entry and a contact face presenting one or more conductors for signal transfer to associated conductors of a complementary connector, wherein the connector comprises a cable entry shield of an electro-conductive material configured to grip onto a cable,
wherein the cable entry shield comprises a first shield portion facing a first side of the cable and a second shield portion facing a second side of the cable, the first and second shield portions being in contact with each other, and
wherein the second shield portion is part of a latch clip, the latch clip comprising one or more latches configured to fasten to a corresponding latching component of the complementary connector.

2. A connector according to claim 1 wherein the first shield portion and the second shield portion grip around the cable at the cable entry.

3. A connector according to claim 1 wherein the cable entry shield is configured as a base of a locking device and the locking device comprises the one or more latches.

4. A connector according to claim 3 wherein the locking device comprises two latches at opposite sides of the connector.

5. A connector according to claim 4 wherein the latches, the actuation section, the resilient section and the base are formed as a single part.

6. A connector according to claim 5 wherein the single part is made of a stamped and bent sheet metal.

7. A connector according to claim 3 wherein the one or more latches are pivotable between a locking position and a release position.

8. A connector according to claim 7 wherein the locking device comprises a resilient section between the base and the one or more latches biasing the latches to the locking position.

9. A connector according to claim 8 wherein the resilient section comprises a U-turn section and an actuation section connecting the U-turn section to the one or more latches for pivoting the latches to the release position against the action of the resilient section.

10. A connector according to claim 9 wherein the housing comprises an open side covered by the actuation section of the locking device.

11. A connector according to claim 10 wherein the actuation section comprises one or more stops abutting a respective edge of the housing bordering the open side of the housing.

12. A connector according to claim 1 wherein a second shielding part of the connector is a pin holder, holding ends of alignment pins extending through a ferrule.

13. A connector according to claim 1 wherein the connector is an optical or electrical cable connector.

14. An apparatus comprising:
the connector according to claim 1; and
the cable,
where the cable entry shield grips around the cable at the cable entry.

15. A connector comprising a housing with a cable entry and a contact face presenting one or more conductors for signal transfer to associated conductors of a complementary connector, wherein the connector comprises a cable entry shield of an electro-conductive material configured to grip around a cable at the cable entry, and wherein the cable entry shield is further configured as a base of a locking device, the locking device comprising a latch section and an actuation section configured such that motion of the actuation section moves the latch section.

16. A connector comprising a housing with a cable entry and a contact face presenting one or more conductors for signal transfer to associated conductors of a complementary connector, wherein the connector comprises a cable entry shield of an electro-conductive material,
wherein the cable entry shield comprises a first shield portion and a second shield portion, wherein the first shield portion and the second shield portion are collectively configured to surround a cable when placed in contact with each other, and
wherein the second shield portion is attached to a latch configured to fasten to a corresponding latching component of the complementary connector.

17. A connector according to claim 16 wherein the latch is connected to an actuation section configured to release the latch from the corresponding latching component when pressed.

18. A connector according to claim 17 wherein the actuation section comprises a U-shaped portion.

19. A connector according to claim 16 wherein the first shield portion comprises a first locking component and the second shield portion comprises a second locking component configured to lock to the first locking component.

20. A connector according to claim 16 further comprising a gasket for sealing the housing against an inner surface of the complementary connector when the connector is connected with the complementary connector.

* * * * *